(12) United States Patent
Mohamed et al.

(10) Patent No.: US 12,738,742 B2
(45) Date of Patent: Sep. 15, 2026

(54) APPARATUS, SYSTEM AND METHOD FOR OPERATING AND PROTECTING ELECTRIC VEHICLE AS A POWER SOURCE

(71) Applicant: EATON INTELLIGENT POWER LIMITED, Dublin (IE)

(72) Inventors: Ahmed A. Mohamed, Arvada, CO (US); Vijay Bhavaraju, Arvada, CO (US); Santino Fiorello Graziani, Aliquippa, PA (US); Sandy Omar Jimenez Gonzalez, Coraopolis, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 358 days.

(21) Appl. No.: 18/238,131

(22) Filed: Aug. 25, 2023

(65) Prior Publication Data

US 2025/0070561 A1 Feb. 27, 2025

(51) Int. Cl.
*H02J 3/32* (2026.01)
*B60L 55/00* (2019.01)
(Continued)

(52) U.S. Cl.
CPC .............. *H02J 3/322* (2020.01); *B60L 55/00* (2019.02); *H02J 3/388* (2020.01); *H02J 3/381* (2013.01)

(58) Field of Classification Search
CPC .. H02J 3/322; H02J 3/388; H02J 3/381; H02J 2310/48; B60L 55/00
(Continued)

(56) References Cited

U.S. PATENT DOCUMENTS 11,191,077 B2 11/2021 Wu et al.
11,712,966 B2 8/2023 Thompson et al.
(Continued)

FOREIGN PATENT DOCUMENTS

BR P10719998 A2 3/2014
CN 209441200 U 9/2019
(Continued)

OTHER PUBLICATIONS

Sami, I. et al. "A Bidirectional Interactive Electric Vehicles Operation Modes: Vehicle-to-Grid (V2G) and Gridto-Vehicle (G2V) Variations within Smart Grid", Eaton Corporation. Downloaded on Aug. 9, 2023 at 21:55:13 UTC from IEEE Xplore, 6 pp.
(Continued)

*Primary Examiner* — Jigneshkumar C Patel
(74) *Attorney, Agent, or Firm* — Eckert Seamans Cherin & Mellott, LLC

(57) ABSTRACT

A smart load control system includes: a neutral forming auto-transformer (NFT) structured to form a neutral line; a plurality of smart circuit breakers (SCBs) including an islanding and grid-connecting device (IGD) coupled to the electric grid and an EV SCB coupled to the bidirectional EV charger, the IGD structured to sense grid voltage and switch ON and OFF the electric grid, the EV smart circuit breaker structured to sense EV voltage and switch ON and OFF the bidirectional EV charger; and a building energy system manager communicatively coupled to the plurality of SCBs and structured to collect data from each SCB, the data including at least the grid voltage and the EV voltage, select one of grid-connected mode or islanded mode based on the grid voltage and the EV voltage, perform a safe transition to the selected mode, and monitor the grid voltage and the EV voltage.

17 Claims, 8 Drawing Sheets

(51) Int. Cl.
*H02J 3/38* (2026.01)
*H02J 3/388* (2026.01)

(58) Field of Classification Search
USPC .......................................................... 700/295
See application file for complete search history.

(56) References Cited

U.S. PATENT DOCUMENTS

| | | | | |
|---|---|---|---|---|
| 2009/0066287 | A1* | 3/2009 | Pollack | H02J 13/00028 180/65.21 |
| 2010/0082464 | A1* | 4/2010 | Keefe | G06Q 40/12 705/30 |
| 2011/0202418 | A1* | 8/2011 | Kempton | B60L 53/63 705/26.1 |
| 2018/0037121 | A1* | 2/2018 | Narla | H02J 3/38 |
| 2018/0262019 | A1* | 9/2018 | Homma | B60L 53/67 |
| 2021/0129689 | A1* | 5/2021 | Nakamura | B60L 53/34 |

FOREIGN PATENT DOCUMENTS

| | | | |
|---|---|---|---|
| CN | 112124132 | A | 12/2020 |
| EP | 3189572 | A1 | 7/2017 |
| EP | 3585641 | A1 | 1/2020 |
| GB | 2525341 | A | 8/2014 |
| JP | 3187313 | B2 | 7/2001 |
| JP | 2014087228 | A | 5/2014 |
| JP | 6180639 | B2 | 2/2016 |
| WO | 2008/143653 | A2 | 11/2008 |

OTHER PUBLICATIONS

Nohara, J. et al. "A New 6kW Wireless V2H System with Synchronized Parallel Bidirectional Single-Ended Converters and Bi-Fila Coils", 8th International Conference on Renewable Energy Research and Applications Brasov, Romania, Nov. 3-6, 2019, 5 pp.

Arora, N. et al. "A Novel Smart Meter for Better Control over Devices Including Electric Vehicles and to Enable Smart use of Power in Smart Home", Eaton Corporation. Downloaded on Aug. 9, 2023 at 21:52:43 UTC from IEEE Xplore, 5 pp.

Wang, Y. et al. "Integration of V2H/V2G Hybrid System for Demand Response in Distribution Network", 2014 IEEE International Conference on Smart Grid Communications, 6 pp.

Shemami, M. et al. "Load Shedding Mitigation through Plug-in Electric Vehicle-to-Home (V2H) System", 2017 IEEE, Eaton Corporation. Downloaded on Aug. 9, 2023 at 21:54:30 UTC from IEEE Xplore, 6 pp.

Rautiainen, A. et al. "Requirements for an interface between a plug-in vehicle and an energy system", Paper accepted for presentation at the 2011 IEEE Trondheim PowerTech, 8 pp.

* cited by examiner

Providing a smart load control system that includes (i) a neutral forming auto-transformer (NFT) structured to be coupled to the bidirectional EV charger and form a neutral line in the islanded mode; (ii) a plurality of smart circuit breakers (SCBs) including an islanding and grid-connecting device (IGD) coupled to the electric grid, an EV SCB coupled to the bidirectional EV charger, an NFT SCB coupled to the NFT, and load SCBs coupled to respective loads, each SCB having a sensor and a controller, the IGD being structured to sense grid voltage and switch on and off the electric grid based at least in part on the grid voltage, the EV smart circuit breaker being structured to sense EV voltage and switch on and off the bidirectional EV charger based at least in part on the EV voltage; and (iii) a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, and perform a safe transition to the selected mode

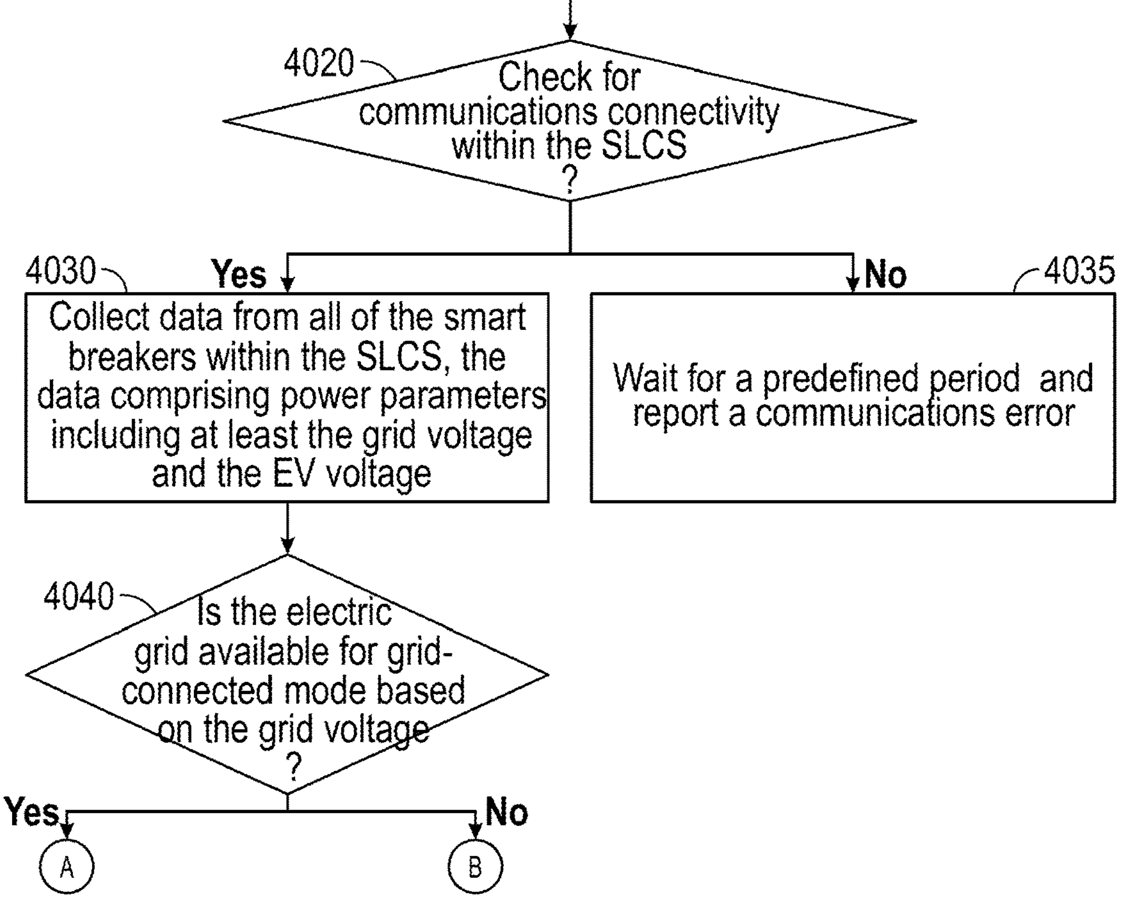

FIG. 4A

APPARATUS, SYSTEM AND METHOD FOR OPERATING AND PROTECTING ELECTRIC VEHICLE AS A POWER SOURCE

FIELD OF THE INVENTION

The disclosed concept relates generally to an apparatus, system and method of supplying power in an electrical network, and in particular an apparatus, system and method of operating and protecting electric vehicle as a power source in an electrical network.

BACKGROUND OF THE INVENTION

Electric vehicles (EVs) provide a variety of benefits, e.g., without limitation, reduced air pollution, reduced greenhouse gas emissions, and vehicle-to-grid (V2G) services. V2G is similar to regular smart charging, also known as V1G charging, which enables a control of EV charging in a way that allows the charging power to be increased or decreased as needed. V2G enables the charged power to be pushed back to the grid from the EV batteries to balance variations in energy production and consumption, and thus can support a more efficient operation of the electric grid. Further, EV batteries can act as mobile battery energy storage units and provide power for end users. Such an EV battery use is known as Vehicle-to-Everything (V2X), which includes numerous use cases such as Vehicle-to-Buildings (V2B), Vehicle-to-Homes (V2H), Vehicle-to-Load (V2L), Vehicle-to-Microgrid (V2M) and V2G. V2H, V2B, V2L and V2M services enable an EV to provide an emergency backup power at homes, buildings and microgrids to support loads fully or partially during a power outage as well as normal operation. An EV also can be integrated with other distributed energy resources (DERs) such as photovoltaic (PV) solar and/or battery energy storage to form a stable and sustainable microgrid to keep more loads on for longer periods. This has the potential to bring additional values to EV owners by leveraging the large battery in their EVs to replace backup combustion generators and/or home battery storage.

For such use of EVs as an emergency backup power source, smart inverters technology initially used to integrate solar energy and other DERs into the electric grid, can be used to integrate the EVs into the electric grid. Based on charging equipment and EV capability, there can be two approaches for V2X: an AC V2X and a DC V2X. In the AC V2X, an EV includes an onboard smart inverter with grid-forming (forming a grid when the utility is disconnected) and grid-following (following the grid when the utility is connected) capabilities to support bidirectional AC power-flow between the EV and the loads. In the DC V2X, an EVSE (electric vehicle supply equipment) includes an off-board stationary smart inverter, which can supply and receive DC power to and from the EV battery (bidirectional DC). However, in either approach the EVs remain invisible to the electric grids and loads, leaving islanding, reconnection and/or communications among the devices inefficient, haphazard, and dangerous. For example, such uncoordinated islanding and/or reconnection may result in situations in which both the electric grid and the EVs are generating voltage that are not synchronized, creating a significant safety hazards.

There is room for improvement in a V2X technology.

There is a need for an improved interface between the EVs and the grid and/or the loads in a V2X technology.

SUMMARY OF THE INVENTION

These needs, and others, are met by embodiments of the disclosed concept in which smart load control system for use in a power distribution system is provided. The power distribution system includes an electric grid, an aggregator, an electric vehicle (EV) coupled to a bidirectional EV charger and a smart inverter structured to convert direct current output of the EV into alternating current, and a plurality of loads, the electric grid structured to supply power to the loads during a grid-connected mode, the EV structured to power the loads during an islanded mode. The smart load control system includes: a plurality of smart circuit breakers (SCBs) including an islanding and grid-connection device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid based at least in part on the grid voltage, the EV smart circuit breaker (EV SCB) being structured to sense EV voltage and switch ON and OFF the bidirectional EV charger based at least in part on the EV voltage; and a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, perform a safe transition to the selected mode, and monitor the grid voltage and the EV voltage Another embodiment provides a power distribution system. The power distribution system includes a plurality of loads; an electric grid structured to provide power to the loads in a grid-connected mode including a V1G mode and a V2G mode; an electric vehicle (EV) coupled to a bidirectional EV charger and a smart inverter structured to convert direct current output from the EV into alternating current, the EV being structured to be charged by the electric grid in the V1G mode, discharge power to the electric grid in the V2G mode, and provide power the loads in an islanded mode (V2H); an aggregator disposed in a cloud and structured to manage operations of the EV; a smart load control system. The smart load control system includes: a plurality of smart circuit breakers (SCBs) including an islanding and grid-connection device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid based at least in part on the grid voltage, the EV SCB being structured to sense EV voltage and switch ON and OFF the bidirectional EV charger based at least in part on the EV voltage; and a building energy system manager communicatively coupled to the plurality of SCBs and the aggregator, the building energy system manager being structured to collect data from each SCB, the data including at least the grid voltage, the EV voltage, and loads, select one of the grid-connected mode or the islanded mode based on the grid voltage and the EV voltage, perform a safe transition to the selected mode, and continue monitoring the grid voltage and the EV voltage.

Yet another embodiment provides a method of providing power to loads in a power distribution system including an electric grid, an aggregator, an electric vehicle (EV) coupled to a bidirectional EV charger and a smart inverter structured to convert direct current output of the EV into alternating current, and a plurality of loads, the electric grid structured to supply power to the loads during a grid-connected mode, the EV structured to supply power to the loads during an islanded mode. The method includes: providing a smart load control system that includes (i) a plurality of smart circuit breakers (SCBs) including an islanding and grid-connected device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid based at least in part on the grid voltage, the EV smart circuit breaker being structured to sense EV voltage and switch ON and OFF the bidirectional EV charger based at least in part on the EV voltage; and (iii) a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, and perform a safe transition to the selected mode; collecting the data from each SCB; selecting one of the grid-connected mode or the islanded mode based on the grid voltage and the EV voltage; performing a safe transition to the selected mode; and monitoring the grid voltage and the EV voltage.

BRIEF DESCRIPTION OF THE DRAWINGS

A full understanding of the invention can be gained from the following description of the preferred embodiments when read in conjunction with the accompanying drawings in which:

FIGS. 4A-4D are a flow chart for a method of providing power in a power distribution system including an electric vehicle as a secondary power source in accordance with an example embodiment of the disclosed concept.

DETAILED DESCRIPTION OF THE INVENTION

Figure 1:
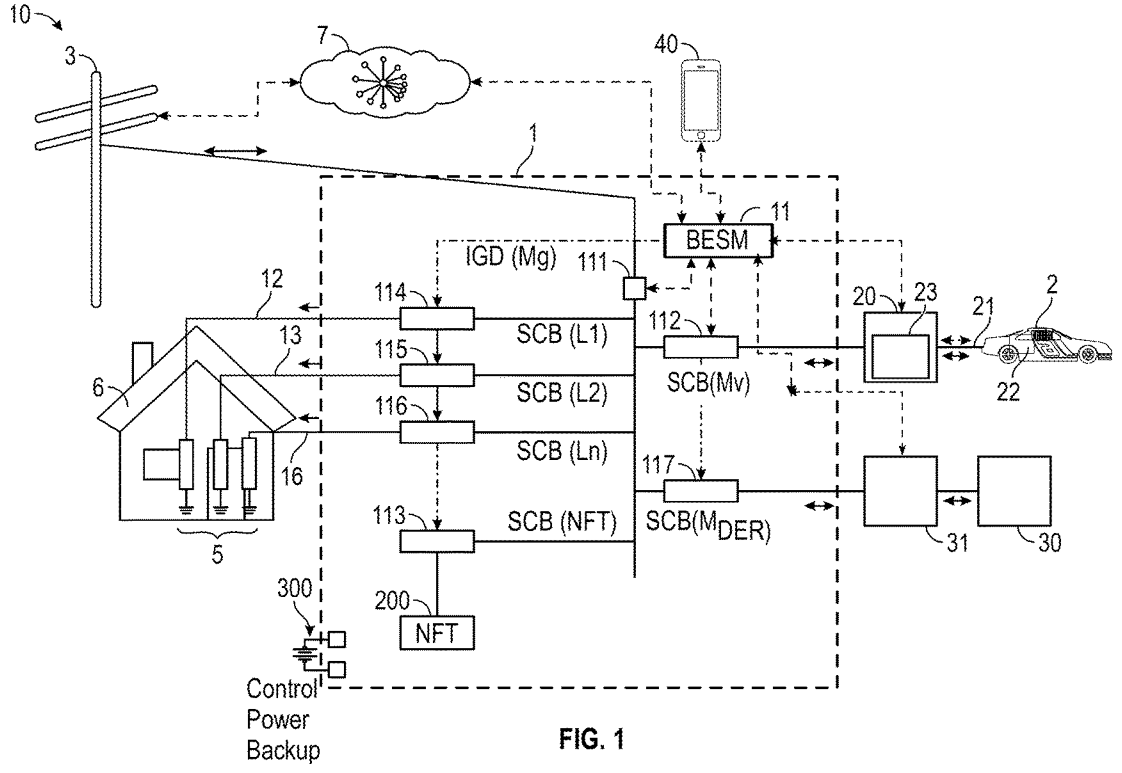
FIG. 1 is a diagram of an exemplary power distribution system including a smart load control system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
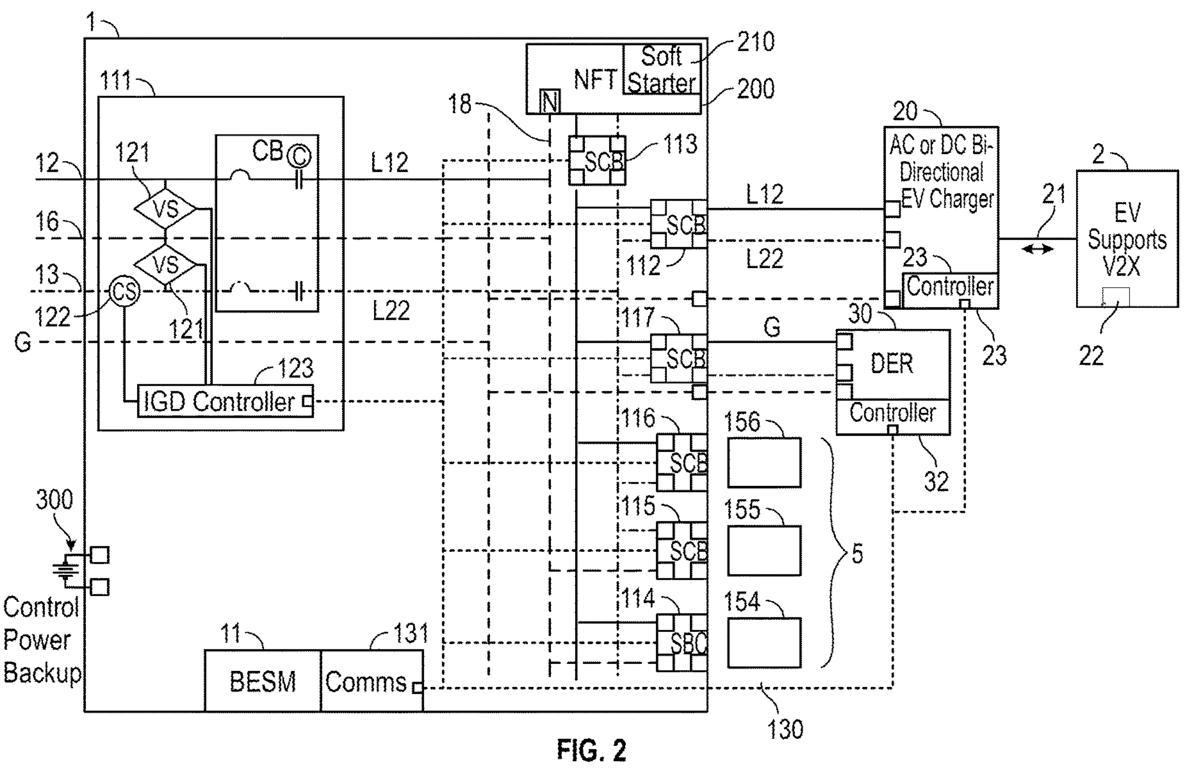
FIG. 2 is a block diagram of an exemplary smart load control system in accordance with an example embodiment of the disclosed concept.

FIG. 1 is a diagram of a power distribution system 10 including an exemplary smart load control system 1 in accordance with an example embodiment of the disclosed concept. FIG. 2 is a block diagram of an exemplary smart load control system 1 in accordance with an example embodiment of the disclosed concept. The power distribution system 10 and the smart load control system 1 are described in detail with reference to FIGS. 1 and 2. The power distribution system 10 includes a smart load control system (SLCS) 1, an electric vehicle (EV) 2, an electric grid 3, a plurality of loads 5, an aggregator 7, a bidirectional EV charger 20 and a user interface device 40. Optionally, the power distribution system 10 may include other distributed energy resources (DERs) 30 such as solar PVs, batteries, and so forth, and a DER interface 31 for connecting among the other DERs 30 and the SLCS 1 for performing power supply and storage functions of the other DERs 30. Optionally, the EV 2 and the other DERs 30 together may form a microgrid to supply power to more loads for longer periods as compared to when either EV 2 or the other DERs 30 are independently supplying secondary power to the loads 5. The plurality of loads 5 may be included in a facility 6 such as a home, a building or other structures. Alternatively, the loads 5 may be mobile devices. An aggregator 7 is a utility cloud server for monitoring and managing the operations of the EV 2 and/or the other DERs 7. The aggregator 7 typically is used for the DERS such as the solar PVs and batteries, but now the inventive building energy system manager 11 allows the aggregator to treat the EV 2 as a DER and enables the aggregator 7 to manage the EV in, e.g., without limitation, the V2G mode.

Figure 3:
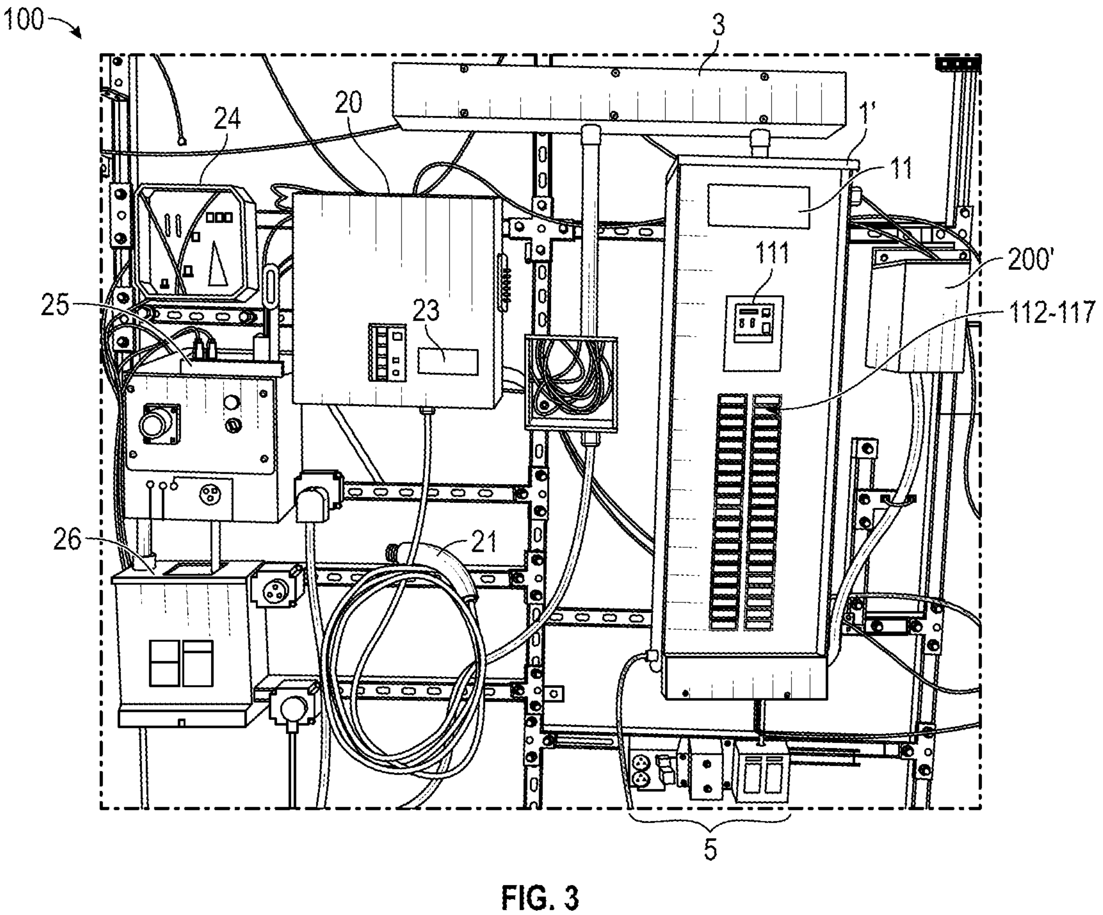
FIG. 3 is a diagram of an exemplary smart load control system in accordance with an example embodiment of the disclosed concept.

The EV 2 is structured to be coupled to the bidirectional EV charger 20 via an EV connector (e.g., without limitation, an EV connector 21 as shown in FIG. 3) for charging and a smart inverter 22. The bidirectional EV charger 20 is structured to convert DC output of the EV 2 into AC so as to provide power to the loads 5 as a secondary power source. The bidirectional EV charger 20 then allows the power to flow in and out of the EV 2 and can be AC or DC bidirectional charger. While FIGS. 1 and 2 show an on-board smart inverter 22 disposed within the EV 2, the smart inverter 22 may be an off-board smart inverter integrated within the bidirectional EV charger 20. As such, the smart load control system advantageously works with an on-board inverter 22 and an off-board inverter. However, regardless of being integrated with on- or off-board smart inverter, the EV 2 still remains invisible to the electric grid 3, the loads 5 and/or the other DERs 30, rendering the process of selecting and/or transitioning to an appropriate power distribution mode inefficient, haphazard, or prone to safety hazards (e.g., damages to the loads and the smart inverter if both the electric grid and the EV supply power to the loads). The SLCS 1 of the disclosed concept specifically remedies such an EV invisibility by connecting the EV 2 thereto, and thus enables a safe transition to a selected power distribution mode.

In general, a power distribution mode includes an islanded mode and a grid-connected mode. In an islanded mode, the electric grid 3 is disconnected or unavailable due, e.g., without limitation, a power outage, and the EV 2 and/or other DERs 30 provide power to the loads 5 as a secondary (backup) power source. In a grid-connected mode, the electric grid 3 is connected or reconnected to the SLCS 1 and provides power to the loads 5 and/or the EV 2. In the grid-connected mode, the EV 2 assumes a grid-following mode. In an islanded mode, the EV 2 assumes a grid-forming mode. Types of the grid-following mode include, e.g., without limitation, an EV-charging (V1G) mode and an EV-to-grid discharging (V2G) mode. In the V1G mode, the EV charges itself from the electric grid 3 and in the V2G mode, the EV discharges power from its battery into the electric grid 3. Types of the grid-forming mode include, e.g., without limitation, an EV-to-home (V2H) mode, an EV-to-building (V2B) mode and an EV-to-microgrid (V2M) mode. In the V2H mode, the EV 2 supplies power to the loads 5 connected to a home as a secondary power source. In the V2B mode, the EV 2 supplies power to the loads 5 connected to a building as a secondary power source. In the V2M mode, the EV 2 forms a microgrid with other DERs 30 available in the power distribution system 10 and the microgrid supplies power to the loads 5 as a secondary power source. The SLCS 1 (specifically, the building energy system manager 11) determines that the power distribution system 10 is to transition to the grid-forming mode based on grid data and EV data. A controller 23 of the bidirectional EV charger 20 or the smart inverter 22 may select a type of the grid-following mode based on the EV charging needs. Alternatively, the building energy system manager 11 may determine the type of a grid-following mode based on the EV data. In some examples, the user may select a power distribution mode and a type of the grid-following mode or the grid-forming mode based on the data collected from the plurality of the smart circuit breakers 111-117 via a user device 40 communicatively coupled to the building energy system manager 11 in a wireless connection.

The SLCS 1 includes a building energy system manager (BESM) 11, a plurality of smart circuit breakers 111-117, a neutral forming transfer (NFT) 200, and a control power backup 300. The SLCS 1 is structured to monitor and control the operations of the components therein and devices coupled thereto (e.g., the EV 2, the electric grid 3, the loads 5, and optionally, the other DERs 30). The plurality of smart circuit breakers includes an islanding and grid-connecting circuit breaker (hereinafter, also referred to as an islanding and grid-connecting device (IGD)) 111, an EV smart circuit breaker 112, the NFT smart circuit breaker 113, the load smart circuit breakers 114, 115, 116, and/or the DER smart circuit breaker 117. In the examples in which the smart inverter is an off-board smart inverter, the SLCS 1 does not include the NFT 200 nor the NFT smart circuit breaker 113. Each smart circuit breaker includes a sensor and a controller, and is connected to respective devices (e.g., the electric grid 3, the EV 2 & the bidirectional EV charger 20, other DERs 30 & DER interface 31, the NFT 200 or loads 5 (120Vac loads 154, 155 and 240Vac load 156)). The sensor includes a voltage sensor (e.g., without limitation, potentiometer), a current sensor (e.g., without limitation, a current transformer), and/or other appropriate sensors. The controller may be a microprocessor, a microcontroller, or some other suitable processing device or circuitry, and include a memory. The smart circuit breakers 111-117 (specifically, the controllers therein) are structured to obtain data associated with the respective devices or loads and communicate with the building energy system manager 11 based on the data via a wireless connection (e.g., without limitation, WiFi) 130.

For example, the islanding and grid-connecting device (IGD) 111 includes voltage sensors 121, a current sensor 122, and an IGD controller 123. The IGD 111 is coupled to the electric grid 3 and structured to sense grid voltage and switch ON and OFF the electric grid 3. The voltage sensor 121 is structured to sense grid voltage and the current sensor 122 is structured to sense grid current, respectively. The IGD controller 123 is coupled to the voltage sensor 121, the current sensor 122, and the building energy system manager 11 via the wireless connection 130. The IGD controller 123 is structured to receive the sensed grid voltage and grid current from the sensors 121, 122, monitor grid status and parameters of the electric grid 3, obtain grid data including the grid status and the grid parameters, communicate with the building energy system manager 11, and switch ON and OFF the electric grid 3 based at least in part on the grid voltage and/or a command from the building energy system manager 11. The grid status includes grid-available status and grid-not-available status and the grid power parameters include grid voltage, current and power quality (e.g., without limitation) frequency, power usage, energy usage, etc.) associated with the electric grid 3. The IGD 111 transmits the grid data to the building energy system manager 11, and receives a command signal from the building energy system manager 11. The command signal may direct the IGD 111 to switch ON to connect the electric grid 3 so as to allow the electric grid 3 to provide power to the loads 5 and/or the EV 2 during the grid-connected mode. Alternatively, the command signal may direct the IGD 111 to switch OFF to disconnect from the electric grid 3 during a power outage or remain switched OFF during the islanded mode. The IGD controller 123 is further structured to enable synchronization between the smart inverter 22, the electric grid 3, or a microgrid. As such, IGD is further structured to transmit a synchronization to the on-board smart inverter 22.

The EV smart circuit breaker 112 is coupled to the bidirectional EV charger 20 and structured to sense EV voltage and switch ON and OFF the bidirectional EV charger 20. While it is not shown in the Figures, the EV smart circuit breaker 112 includes voltage sensors, current sensor and a controller structured to monitor EV status and parameters, obtain EV data, communicate with the building energy system manager 11, the bidirectional EV charger 20, and switch ON or OFF the bidirectional EV charger 20. The EV smart circuit breaker 112 transmits the EV data to the building energy system manager 11 and receives a command signal from the building energy system manager 11 to either switch ON or OFF the bidirectional EV charger 20 (and thus, the EV 2). The EV data include status and power parameters associated with the EV 2. The EV status includes, e.g., without limitation, EV-available or EV-not-available for islanding, EV-charging (V1G) or EV-discharging (V2G) during the grid-connected mode, EV-connected or EV-not-connected during transition to and from the islanded mode to the grid-connected mode or vice versa, etc. The EV power parameters include EV voltage, current, power quality and/or power capability associated with the EV 5. The power capability includes the size and/or rating capability (e.g., 40A, 32A) of the smart inverter 22. The EV smart circuit breaker 112 switches ON the EV 2 upon receiving a command received from the building energy system manager 11 based on the EV-available status or switches OFF the EV 2 upon receiving a command from the building energy system manager 11 based on the EV-not-available status. Further, the EV smart circuit breaker 112 switches ON the EV 2 so as to charge the EV 2 (V1G) from the electric grid 3 or discharge the EV 2 (V2G) as a current source into the electric grid 3 during the grid-connected mode. The EV smart circuit breaker 112 is further structured to switch OFF the EV 2 during the grid-connected mode if the EV 2 is neither charging nor discharging to the electric grid 3.

The load smart circuit breakers are coupled to the building energy system manager 11 via the wireless connection 130 and include load smart circuit breakers 114, 115, coupled to 120V loads 154, 155 and load smart circuit breaker 116 coupled to a 240V load 156 via the lines 12(L1), 13(L2), 16(N). The load smart circuit breakers 114-116 sense respective load voltage and current, determine respective load status and energy requirement, and communicate with at least the building energy system manager 11 and the loads 154-56. They are structured to transmit respective load data including respective load status and energy requirement, receive a command from the building energy system manager 11 based at least in part on the load data, the EV data, the grid data, NFT data and/or DER data, and switch ON and OFF respective loads 154-56 based on the command. For example, during V2H or V2B, upon switched ON of the NFT 200, the NFT 200 forms a neutral line 18 and creates L1-N and/or L2-N current loop. The building energy system manager 11 then transmits a command to the load smart circuit breakers 114-116, the command indicating that the NFT 200 is ON and the load smart circuit breakers 114-116 are to switch ON respective loads 154-56. Based on the command, the load smart circuit breaker 114 switches ON the 120V load 154 and connects the same to L1-N current loop such that the 120V load 154 receives 120Vac from L1-N current. The load smart circuit breaker 115 switches ON the 120V load 155 and connects the same to the L2-N current loop such that the 120V load 155 receives 120Vac from the L2-N current. The load smart circuit breaker 116 switches ON the 240V load 116 and connects the same to the L1-L2 current loop such that the 240V load 156 receives 240Vac from the L1-L2 current. During the grid-connected mode, the building energy system manager 11 transmits a command to the load smart circuit breakers 114-116, indicating that the electric grid 3 is connected and the load smart circuit breakers 114-116 are to switch ON the respective loads 154-56 such that each load 154-56 can receive power from the electric grid 3.

The NFT 200 is coupled to the NFT smart circuit breaker 113 and is structured to form a neural (N) line 18 during the islanded mode. That is, the NFT 200 is structured to receive L1-L2 voltage from the smart inverter 22 and provide split-phase L1, L2 and N during the V2H, V2B or V2M mode. The NFT 131 may be an automatic transformer having a single coil that carries L1-N and L2-N (120Vac) currents, but does not carry L1-L2 (240Vac) currents. That is, the NFT 200 is connected in parallel to the 120V loads 154, 155 only and the full 240Vac current will not pass through the NFT 200. Since only 120Vac current passes through the NFT 200 to the 120V loads 154, 155, this single coil NFT 200 advantageously has a significantly smaller size and/or rating as compared to the full 240Vac capacity transformer. This allows the EV 2 to directly supply 240Vac to the 240V load 156 while the NFT 200 provides 120Vac to the smaller loads (the 120V loads 154, 155). It further provides a flexibility and convenience in design and manufacturing of the SLCS 1, by allowing the NFT 200 to be included within the SLCS 1 having a limited space therein as shown in FIGS. 1 and 2 or disposed external to the SLCS 1 as shown in FIG. 3.

In addition, the NFT 200 advantageously includes a soft starter 210 structured to reduce inrush currents during switching ON and OFF of the NFT 200. The soft starter 210 is further structured to maintain current from the smart inverter 22 to be within limits (e.g., without limitation, 32A) of the smart inverter 22. The NFT smart circuit breaker 113 is structured to connect the NFT 200 to the 120V loads 154, 155 by switching ON the NFT 200 and disconnect the NFT 200 from the 120V loads 154, 155 by switching OFF the NFT 200 based on a selected power distribution or operation mode. For example, during the grid-connected mode, the NFT 200 is not needed. As such, the building energy system manager 11 transmits an NFT-OFF signal to the NFT smart circuit breaker 113 to disconnect the NFT 200. The NFT smart circuit breaker 113 then switches OFF and disconnects the NFT 200 for an efficient operation of the grid-connected mode. During the V2H or V2B mode, the building energy system manager 11 transmits an NFT-ON signal to the NFT smart circuit breaker 113, which in turn switches ON the NFT 200 and connects the same to the 120V loads 154, 155 for supplying 120V power. Optionally, in the V2M mode, the NFT smart circuit breaker 113 is structured to connect the NFT 200 to the EV 2 and/or the other DERs 30 via the DER smart circuit breaker 117 and provide 120Vac to 120V loads 154, 155 from the microgrid. In the examples in which the smart inverter is an off-board inverter, the off-board inverter will generate split-phases needed, and thus the SLCS 1 does not include the NFT 200, the NFT SCB 113 nor the soft starter 210.

The control power backup 300 may be a USB power bank and is structured to provide control power to the SLCS 1 when neither the electric grid 3 nor the EV 2 is connected to the SLCS 1 to supply power. For example, during a power outage, while transitioning to the islanded mode, the EV 2 is not yet connected to the SLCS 1 or the loads 5. In such a scenario, the control power backup advantageously is structured to provide control power to the SLCS 1 so as to allow the building energy system manager 11 to continue to control and communicate with the EV 2, the bidirectional EV charger 20, the smart inverter 22, the loads 5, the aggregator 7, and/or optionally, the other DERs 30.

The building energy system manager 11 is coupled to the plurality of smart circuit breakers 111-117 and the aggregator 7. It is structured to collect data from each SCB 111-117, the data including at least the grid voltage and the EV voltage, select one of the grid-connected mode or the islanded mode based on the grid voltage and the EV voltage, perform a safe transition to the selected mode, and monitor the grid voltage and the EV voltage. The data also include the load data, NFT data and/or DER data. The NFT data include the status of the NFT 120 (ON or OFF). The DER data include DER status and power parameters including DER voltage, current and power quality (e.g., without limitation) frequency, power usage, energy usage, etc.) associated with the DERs 30. Based on the collected data, the building energy system manager 11 performs selection and transition to a power distribution mode for the power distribution system 10 and enables a safe transition to an operation mode (e.g., without limitation, V1G, V2G, V2H, V2B, etc.) for the EV 2, the electric grid 3, the loads 5 and/or the other DERs 30. The selection and transition to a selected power distribution mode is discussed in detail with reference to FIG. 4. The building energy system manager 11 may be, for example and without limitation, a microprocessor, a microcontroller, or some other suitable processing device or circuitry. The memory, which can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may include a software, firmware, set of instruction to perform building energy system management within the SLCS 1 and the power distribution system 10.

The building energy system manager 11 includes a communication module 131 and is further structured to communicate with the plurality of smart circuit breakers 111-117, the aggregator 7, the bidirectional EV charger 20, the loads 5, and optionally the other DERs 30 via the communication module 131 using the wireless connection 130. It is further structured to control and protect single-phase loads (120V loads 154, 155) and the NFT 200 in different operation modes. It is further structured to provide overvoltage, overcurrent and frequency protection, meter the power parameters of the electric grid 3, and monitor the power parameters of the electric grid 3, the EV 2, and/or the other DERs 30. In some examples, the building energy system manager 11 is also structured to enable other DERs (e.g., without limitation, solar panels, batteries, etc.) to perform their power supply and/or storage functions within the power distribution system 10. Further, the building energy system manager 11 also allows the EV 2 and the other DERs 30 to form a microgrid during the islanded mode. The building energy system manager 11 is further structured to ensure safety and power quality within the power distribution system 10. The building energy system manager 11 is further structured to perform interlocking between powers from the electric grid 3, the EV 2, and/or the other DERs 30 in order to ensure safety and protect the system 10 and the devices connected thereto. When transitioning to a selected mode (e.g., a grid-connected to islanded mode and vice versa), interlocking makes sure that there is no voltage in the islanded loads. Further, interlocking ensures safety by opening all of the SCBs 11-117 before neutral18 is formed (when the on-board smart inverter 22 is being used) such that overvoltage in the islanded loads 154-156 is avoided. This interlocking using the SCBs 111-117 is more safer than software-only based interlocking. In the off-board smart inverter scenario, the off-board smarter inverter will balance the L1-N voltage and the L2-N voltage, and thus no opening of the SCBs is required. The interlocking is discussed further in detail with reference to FIG. 4.

In addition, the building energy system manager 11 is further structured to perform load management during the islanded mode based on the power capability of the smart inverter 22 and the power required by the loads 5 individually and collectively. The number of the loads 5 coupled to the SLCS 1 is known because when the electric grid 3 is connected, the building energy system manager 11 monitors each connected load 5. As such, how much power each load 18 requires is known. Before islanding, the building energy system manager 11 confirms individual and collective power requirements of the loads 5. Upon determining the power capability of the smart inverter 22, the building energy system manager 11 may cause one or more load smart circuit breakers 114-116 to switch ON or OFF respective loads so as not to overload the smart inverter 22. The building energy system manager 11 is further structured to communicate with the aggregator 7 and perform EV and DER management.

FIG. 3 is a diagram of an exemplary smart load control system 1' in accordance with an example embodiment of the disclosed concept. The SLCS 1' is similar to the SLCS 1 of FIGS. 1 and 2, and thus overlapping description of the similar components is omitted for sake of brevity. The SLCS 1' is different from the SLCS 1 in that the NFT 200' is disposed external to the SLCS 1' due to, e.g., limited space available in a building control center or a home garage. It also shows devices (e.g., without limitation, EVcc 24, PWM handshaking device 25 and EV emulator 26) associated with the operation of the bidirectional EV charger 20. These devices are well known in the EV charging technology and thus corresponding description is omitted for sake of brevity.

Figure 4B:
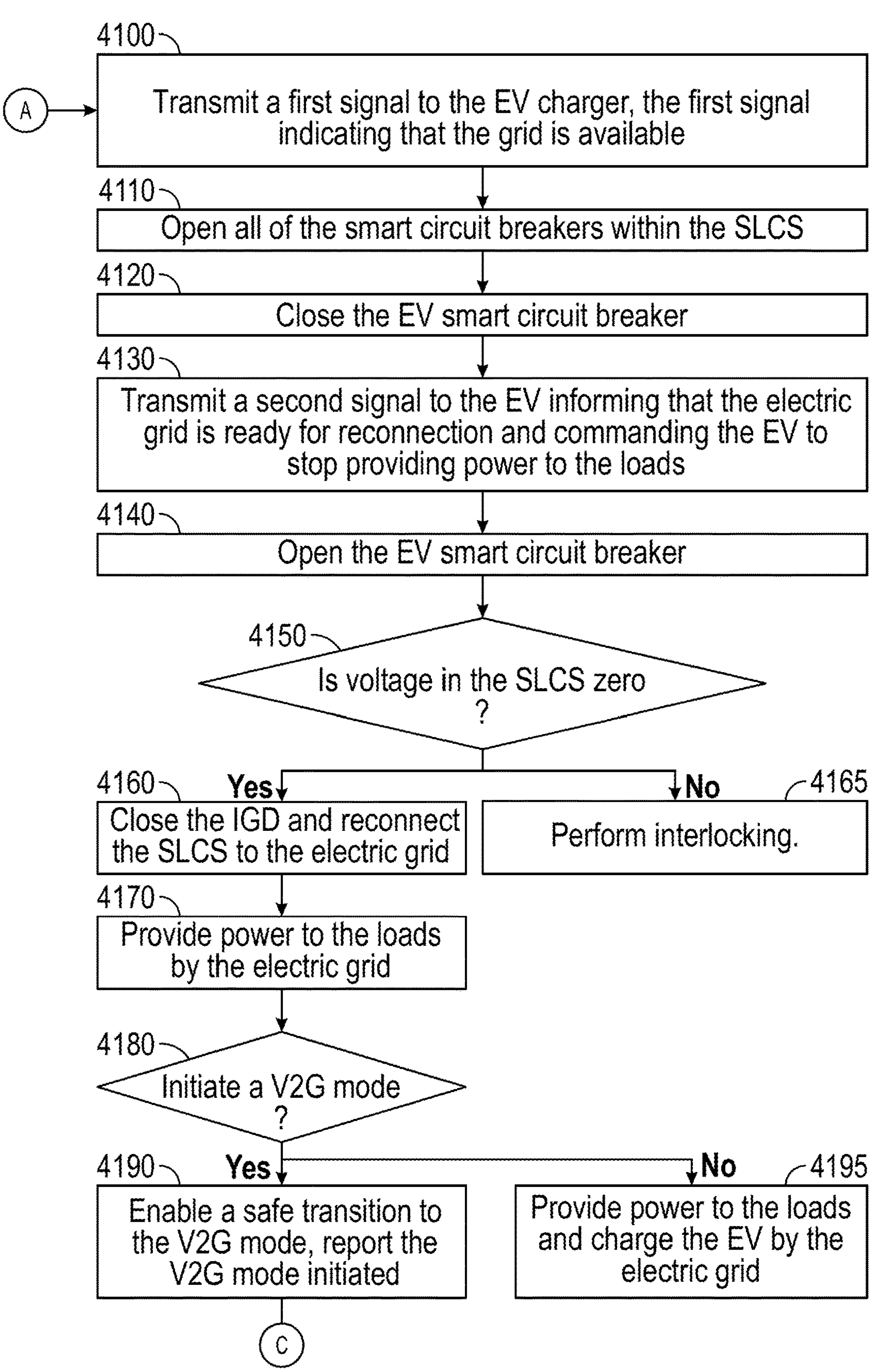
Figure 4C:
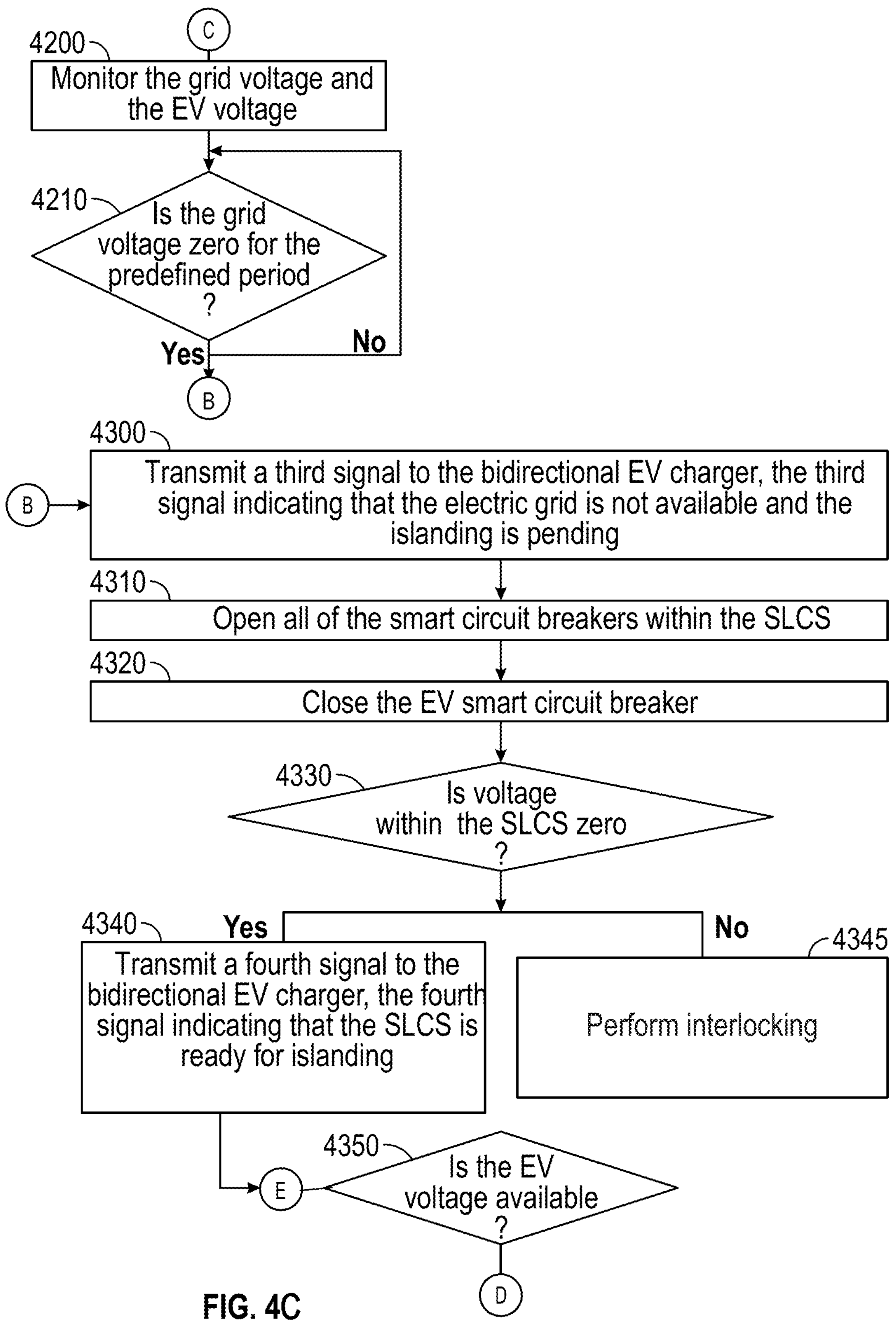
Figure 4D:
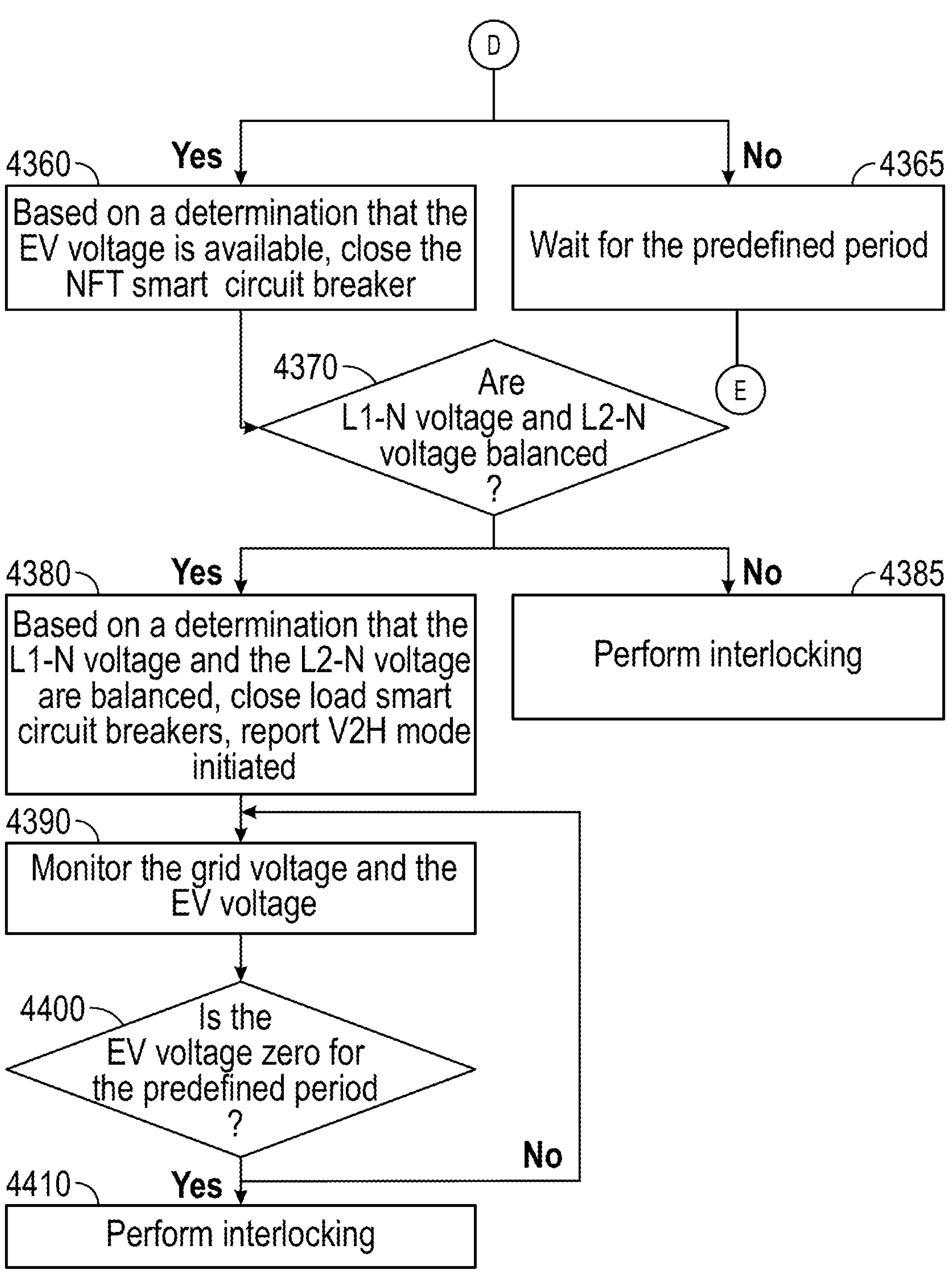

FIG. 4 is a flow chart for a method 4000 of providing power in a power distribution system including an electric vehicle as a secondary power source in accordance with an example embodiment of the disclosed concept. The method 4000 may be performed by the smart load control system (SLCS) 1, 1' of FIGS. 1-3 or any components thereof. Since the SLCS 1, 1' includes an on-board smart inverter 22, the NFT 200, the soft starter 210 and the NFT SCB 113, the method 4000 includes steps performed associated with these components. However, it will be noted that the method 4000 may be performed without those steps if the SCLS includes an off-board smart inverter.

At 4010, the SLCS is provided in a power distribution system. The smart load control system that includes (i) a neutral forming auto-transformer (NFT) structured to be coupled to the bidirectional EV charger and form a neutral line in the islanded mode; (ii) a plurality of smart circuit breakers (SCBs) including an islanding and grid-connecting device (IGD) coupled to the electric grid, an EV SCB coupled to the bidirectional EV charger, an NFT SCB coupled to the NFT, and load SCBs coupled to respective loads, each SCB having a sensor and a controller, the IGD being structured to sense grid voltage and switch on and off the electric grid based at least in part on the grid voltage, the EV smart circuit breaker being structured to sense EV voltage and switch on and off the bidirectional EV charger based at least in part on the EV voltage; and (iii) a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, and perform a safe transition to the selected mode.

At 4020, the building energy system manager of the SLCS checks for communications connectivity within the SLCS. If the communications connectivity is good, the method 4000 proceeds to 4030. If it is not good, the method 4000 proceeds to 4035. The communication connectivity is good if the building energy system manager detects signals from relevant smart circuit breakers at respective stage. For example, the building energy system manager continuously checks for the grid voltage or the EV voltage based on signals received from the islanding and grid-connecting device (IGD) or the EV smart circuit breaker, respectively. If the building energy system manager fails to detect a signal from the IGD or the EV smart circuit breaker, it can be indicative of a communications error. At 4035, the building energy system manager waits for a predefined period, e.g., without limitation, 60s, 90s, etc., As such, if there is a transient voltage surge is detected, it is not treated as the grid voltage or the EV voltage. If the communications connectivity is still poor or lacking upon a lapse of the predefined period, the building energy system manager reports a communications error. The user or field engineer may then perform the diagnostics and maintenance and/or repair, if needed.

At 4030, the building energy system manager collects data from at least the IGD, the EV smart circuit breaker and the loads smart circuit breakers based on a determination that the communication connectivity is good. The data include, e.g., without limitation, grid status, EV status, loads status, grid parameters, EV parameters, and load energy requirement. The power parameters including status of voltage, current, frequency, power usage and/or energy usage over a period associated with the electric grid, the EV, the loads or the DERs, if any, within the power distribution system. For mode selection, the building energy system manager reviews the detected grid voltage or the detected EV voltage.

At 4040, the building energy system manager determines if the electric grid is available for reconnection based on the detected grid voltage. If the IGD detects the grid voltage has remained a predetermined voltage (e.g., without limitation, 240V) for a predefined period (e.g., without limitation, 60s, 90s, etc.), then the building energy system manager determines that the electric grid is indeed available for to the loads and/or the EV for supplying power. If the building energy system manager determines that the electric grid is available for reconnection, the method 4000 proceeds to 4100. If the IGD, however, senses an interruption in the grid voltage or does not sense the grid voltage (e.g., zero), the building energy system manager determines that the electric grid is not available for reconnection. If the building energy system manager determines that the electric grid is not available, the method 4000 proceeds to 4300 for transitioning to an islanded mode.

At 4100, the building energy system manager transmits a first signal to the bidirectional EV charger, the first signal indicating that the electric grid is available but reconnection is still pending so as to ensure that the EV is not providing any voltage to the loads while reconnection is pending. The bidirectional EV charger in turn informs the EV that the electric grid is back, but the IGD has not yet closed since the electric grid is not yet connected and still pending for reconnection.

At 4110, the building energy system manager causes all of the smart circuit breakers (e.g., the NFT smart circuit breaker and all of the load smart circuit breakers) so as to ensure safety. Opening these smart circuit breakers ensures that the EV is not providing voltage to the loads during the transition to the grid-connected mode. Specifically, the opening of all of the load smart circuit breakers ensures that no 120V loads are exposed to 240V EV voltage while the NFT smart circuit breaker is not closed. In the examples in which the SLCS includes an off-board smart inverter, the building energy manager causes all of the load smart circuit breaker therein to open so as to ensure safety.

At 4120, the building energy system manager causes the EV smart circuit breaker to close upon opening the NFT smart circuit breaker and all of the load smart circuit breakers. Closing the EV smart circuit breaker ensures that the EV has 240V. Then, a smart inverter (on or off-board) is closed. By closing the EV smart circuit breaker and the smart inverter, the EV is now connected to the building energy system manager and visible to at least the loads and the building energy system manager, and thus the building energy system manager can now communicate with the EV via the bidirectional EV charger. In the examples in which the SLCS includes an off-board smart inverter, the building energy manager causes the EV smart circuit breaker to close upon closing of all of the load smart circuit breakers.

At 4130, upon closing of the EV smart circuit breaker, the building energy system manager transmits a second signal to the EV informing that the electric grid is ready for reconnection and commanding the EV to stop providing power to the loads as the secondary power source. The bidirectional EV charger then causes the smart inverter to change the mode thereof. The smart inverter then changes its mode to the grid-following mode.

At 4140, the building energy system manager causes the EV smart circuit breaker to open.

At 4150, the building energy system manager confirms that voltage (or the EV voltage) within the SLCS is zero (or substantially zero) so as to ensure further safety. The EV voltage may be substantially zero if the detected EV voltage is between 0V and e.g., without limitation, 40V line-to-line. If the EV voltage is not zero, that means that the EV is being non-responsive to the command and has not been disconnected from the SLCS. If the electric grid is reconnected while the EV is still connected to the loads, there will be two voltages being supplied to the loads, creating safety concerns. If the building energy system manager confirms that the voltage (or the EV voltage) within the SLCS is zero, the method 4000 proceeds to 4160. If the building energy system manager fails to confirm that the voltage (or EV voltage) within the SLCS is zero, the method 4000 proceeds to 4165. At 4165, the building energy system manager performs interlocking. Interlocking includes causing all of the smart circuit breakers to open. The building energy system manager then reports an error. The user or field engineer may perform diagnostics on site, or simply connect to the EV.

At 4160, the building energy system manager closes the IGD and reconnects the SLCS to the electric grid.

At 4170, the electric grid provides power to the loads.

At 4180, the building energy system manager determines if it should initiate the V2G mode. If it has received a signal from the bidirectional EV charger that the V2G mode has been selected, the method 4000 proceeds to 4190. If no, the method 4000 proceeds to 4195. If the bidirectional EV charger determines that the EV has sufficient charges to share with the electric grid, it selects the V2G mode for discharging the EV current to the electric grid and transmits to the building energy system manager a signal indicative of the selection of the V2G mode. As such, the building energy system manager determines to initiate the V2G mode based on the signal. If the bidirectional EV charger determines that the EV needs to be recharged, it simply accepts the power from the electric grid and charges the EV (the V1G mode). Thus, at 4195 the electric grid provides power to the loads and charges the EV.

At 4190, the building energy system manager enables a safe transition to the V2G mode and reports that the V2G mode has been initiated.

At 4200, the building energy system manager monitors the grid voltage and the EV voltage. The bidirectional EV charger may resume the V1G mode if needed.

At 4210, the building energy system manager determines if the grid voltage is zero for the predefined period. If yes, the method 4000 proceeds to 4300. If no, the method 4000 returns to 4200.

At 4300, based on a determination that the electric grid is not available, the building energy system manager transmits a third signal to the bidirectional EV charger, the third signal indicating that the electric grid is not available, and thus the islanding is pending.

At 4310, the building energy system manager causes all of the smart circuit breakers within the SLCS to open so as to ensure that all loads are connected to the EV at the same time upon commencing the islanded mode. Ensuring the simultaneous connection of all of the loads to the EV is important since the EV has limited power capability.

At 4320, the building energy system manager causes the EV smart circuit breaker to close in order to check the EV voltage within the SLCS.

At 4330, the building energy system manager checks voltage within the SLCS to ensure that neither the electric grid nor any DERs are providing power to the loads. If the voltage within the SLCS is zero (or substantially zero), that means that there is neither the grid voltage or DER voltage supplied within the SLCS, and thus the SLCS is ready for islanding. As such, the method 4000 proceeds to 4340. If the voltage within the SLCS is not zero, the method 4000 proceeds to 4345. At 4345, the building energy system manager performs interlocking. Interlocking includes opening all of the smart circuit breakers within the SLCS and stopping transition to the islanded mode. The building energy system manager then reports an error.

At 4340, the building energy system manager transmits a fourth signal to the bidirectional EV charger, the fourth signal indicating that the SLCS is ready for islanding and for receiving power from the EV.

At 4350, the building energy system manager checks if the EV voltage is available in order to ensure that the EV is providing power to the loads as the secondary power source. The EV is available for islanding if the EV voltage remains a predetermined voltage for a predefined period. Typically, the EV voltage is 240V. If the building energy system manager determines that the EV voltage remains 240V for a predefined period (e.g., without limitation, 60s, 90s, etc.), then the method 4000 proceeds to 4360. If not, the method 4000 proceeds to 4365. At 4365, the building energy system manager waits for the predefined period and upon a lapse of the predefined period, the method 4000 returns to 4350.

At 4360, the building energy system manager causes the NFT smart circuit breaker to close. The NFT creates a neutral line and forms an L1-N current loop and an L2-N current loop.

At 4370, the building energy system manager determines if the L1-N voltage and L2-N voltage are balanced. The voltages are balanced if the L1-N voltage and L2-N voltage range from 108 to 132Vac. If yes, the method 4000 proceeds to 4380. If no, the method 4000 proceeds to 4385. At 4385, the building energy system manager performs interlocking by causing all of the smart circuit breakers to be open, stop initiating the V2H mode and reporting an error.

At 4380, based on a determination that the L1-N voltage and L2-N voltage are balanced, the building energy system manager closes the load smart circuit breakers, report that the V2H mode has been initiated.

At 4390, the building energy system manger monitors the grid voltage and the EV voltage.

At 4400, the building energy system manager determines if the EV voltage is zero for the predefined period. If yes, the method 4000 proceeds to 4410. If no, the method 4000 returns to 4390.

At 4410, the building energy system manager performs interlocking. It opens all of the smart circuit breakers, stops the V2H mode, and reports that the EV is not available. When transitioning to a selected mode (e.g., a grid-connected to islanded mode and vice versa), interlocking makes sure that there is no voltage in the islanded loads. Further, interlocking ensures safety by opening all of the SCBs before neutral is formed (when an-on-board smart inverter is being used) such that overvoltage in the islanded loads is avoided. In the off-board smart inverter scenario, the off-board smarter inverter will balance the L1-N voltage and the L2-N voltage, and thus no opening of the SCBs is required.

Figure 5:
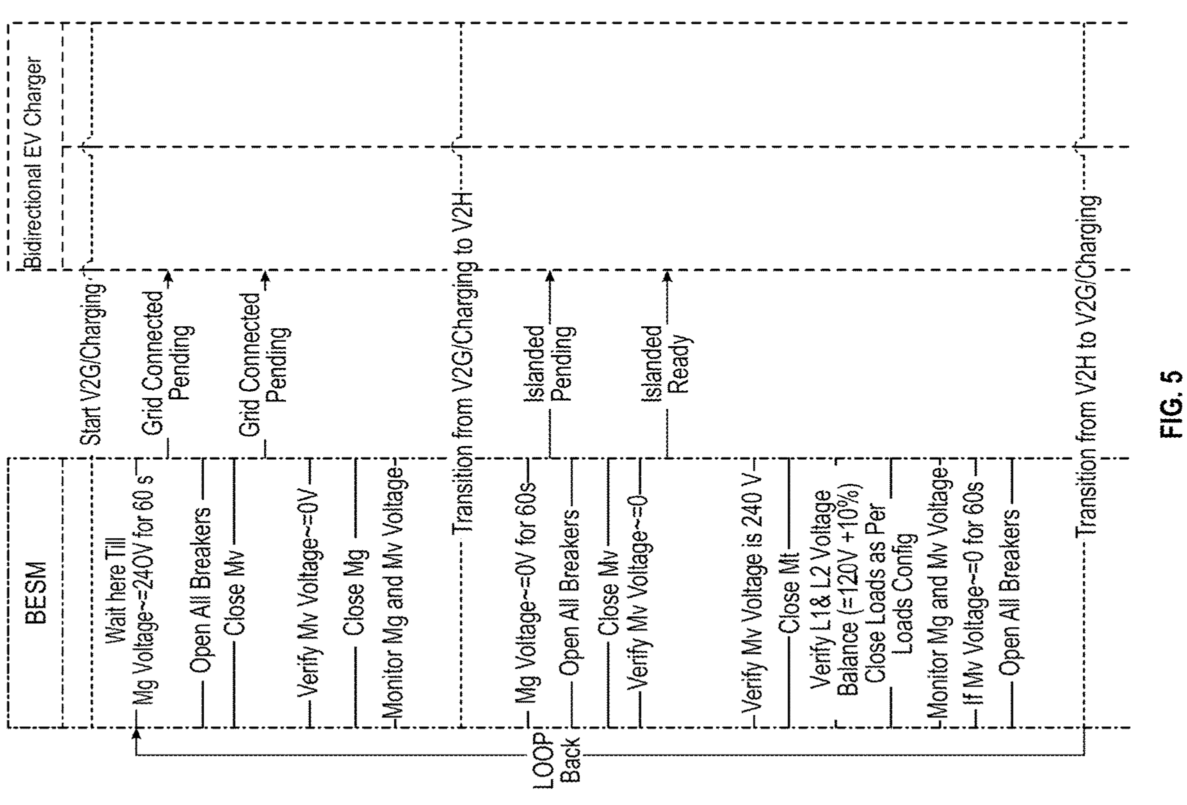
FIG. 5 is a sequence logic of the building energy system manager for performing safe transitions back and forth between a grid-connected mode and an islanded mode according to a non-limiting, example embodiment of the disclosed concept.

FIG. 5 is a sequence logic of the building energy system manager for transitioning back and forth between a V2G/V1G mode and a V2H mode according to a non-limiting, example embodiment of the disclosed concept. In FIG. 5, the grid voltage is referred to as Mg voltage, the EV voltage referred to as Mv voltage, the NFT voltage is Mt voltage, the IGD is referred to as Mg, the EV SCB is referred to as Mv, and the NFT SCB is referred to as Mt.

First, the building energy system manager performs the grid-connected mode by determining that the grid voltage remains a predetermined voltage (e.g., without limitation, 240V) for a predefined period (e.g., without limitation, 60s) and based on the determination, it transmits a first signal to the bidirectional EV charger, the first signal indicating that the electric grid is available for reconnection. It also informs that the reconnection is pending. Then, the building energy system manager opens all of the smart circuit breakers within the smart loading control system (SLCS), closes the EV smart circuit breaker coupled to the bidirectional EV charger and transmits a second signal to the bidirectional EV charger, the second signal indicating that the electric grid is ready for reconnection and commanding the EV to stop providing power to the loads. Then, the building energy system manager verifies that the EV voltage (or voltage) within the SLCS is zero (or substantially zero), closes the islanding and grid-connecting device (IGD) and reconnects the electric grid to the SLCS, the loads and/or the EV for charging (V1G) or discharging (V2G). The building energy system manager monitors the grid voltage and the EV voltage.

Next, the building energy system manager enables a safe transition from the V1G/V2G mode to the V2H mode. The building energy system manager determines that the grid voltage has remained zero for the predefined period and transmits a third signal to the bidirectional EV charger, the third signal indicating that islanding is pending. Then, the building energy system manager opens all of the smart circuit breakers, closes the EV smart circuit breaker, verifies that EV voltage (or voltage) detected within the SLCS is zero (or substantially zero) and transmits a fourth signal to the bidirectional EV charger, the fourth signal indicating that the SLCS is ready for islanding. Then, the building energy system manager verifies that the EV voltage is 240V, closes a neutral forming transfer (NFT) smart circuit breaker upon such verification, and further verifies that the L1-N voltage and the L2-N voltage are balanced (e.g., without limitation, the L1-N voltage and L2-N voltage range from 108 to 132Vac (i.e., 120V±10%)). Upon the voltage balance verification, the building energy system manager closes the load smart circuit breakers as per loads configuration, and initiates (or performs) V2H mode. The building energy system manager monitors the grid voltage and the EV voltage. If the EV voltage is zero (or substantially zero) for the predefined period, then building energy system manager opens all of the smart circuit breakers and transitions back to the V2G/V1G mode.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A smart load control system for use in a power distribution system including an electric grid, an aggregator, an electric vehicle (EV) coupled to a bidirectional EV charger and a smart inverter structured to convert direct current output of the EV into bidirectional alternating current, and a plurality of loads, the electric grid structured to supply power to the loads during a grid-connected mode, the EV structured to supply power to the loads during an islanded mode, the smart load control system comprising:

a plurality of smart circuit breakers (SCBs) including an islanding and grid-connecting device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid, the EV smart circuit breaker being structured to sense EV voltage and switch ON and OFF the bidirectional EV charger; and a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, perform a safe transition to the selected mode, and monitor the grid voltage and the EV voltage, wherein the building energy system manager is structured to select the grid-connected mode based on a determination that the grid voltage has remained a predetermined voltage for a predefined period, and wherein for performing a safe transition to the selected mode, the building energy system manager is further structured to:

transmit a first signal to the bidirectional EV charger, the first signal indicating that the electric grid is available for reconnection;

open all of the SCBs;

close the EV SCB and transmit a second signal to the bidirectional EV charger, the second signal informing that the electric grid is ready for reconnection and commanding the EV to stop providing power to the loads;

open the EV SCB and verify that the EV voltage has remained zero for the predefined period;

close the IGD and reconnect the smart load control system to the electric grid; and provide power to the loads from the electric grid.

2. The smart load control system of claim 1, wherein based on a determination that the building energy system manager has failed to verify that the EV voltage has remained zero for the predefined period, the building energy system manager is further structured to perform interlocking.

3. The smart load control system of claim 1, wherein the grid-connected mode comprises a V1G mode and a V2G mode, wherein the bidirectional EV charger selects the V2G mode and transmits the signal indicative of the selection of the V2G mode, and wherein the building energy system manager is further structured to perform a safe transition to the V2G mode.

4. The smart load control system of claim 1, wherein the building energy system manager is structured to select the islanded mode based on a determination that the grid voltage has not remained a predetermined voltage for a predefined period or has remained zero for the predefined period, and wherein for performing a safe transition to the selected mode, the building energy system manager is further structured to:

transmit a third signal to the bidirectional EV charger, the third signal indicating that islanding is pending;

open all of the SCBs;

close the EV SCB and verify that voltage detected in the smart load control system has remained zero for the predefined period;

transmit a fourth signal to the bidirectional EV charger, upon verifying that the voltage detected in the smart load control system has remained zero for the predefined period, the fourth signal indicating that the smart load control system is ready for islanding; and verify that the EV voltage has remained a predetermined voltage for the predefined period.

5. The smart load control system of claim 4, wherein the smart inverter is an off-board smart inverter and the building energy system manager is further structured to:

close load SCBs upon verifying that the EV voltage has remained the predetermined voltage for the predefined period; and provide power to the loads from the EV.

6. The smart load control system of claim 4, wherein the smart inverter is an on-board smart inverter and the smart load control system further comprises:

a neutral forming auto-transformer (NFT) comprising a soft starter and structured to be coupled to the bidirectional EV charger and form a neutral line during the islanded mode with an on-board smart inverter; and an NFT SCB coupled to the NFT, wherein the soft starter is structured to reduce inrush currents during switching ON and OFF of the NFT by the NFT SCB and allow current from the smart inverter to be within limits of the smart inverter.

7. The smart load control system of claim 6, wherein the building energy system manager is further structured to:

close the NFT SCB and verify that L1-N voltage and L2-N voltage are balanced;

close load SCBs upon verifying that the L1-N voltage and the L2-N voltage are balanced; and provide power to the loads from the EV.

8. The smart load control system of claim 7, wherein the building energy system manager is further structured to perform interlocking based on at least one of (i) a determination that the voltage detected in the smart load control system has not remained zero for the predefined period; and (ii) a determination that the L1-N voltage and the L2-N voltage are not balanced.

9. The smart load control system of claim 1, further comprising:

a control power backup structured to provide control power to the smart load control system during the transition and/or based on a determination that neither the electric grid nor the EV is connected to the smart load control system to supply power.

10. A power distribution system comprising:

a plurality of loads;

an electric grid structured to provide power to the loads in a grid-connected mode;

an electric vehicle (EV) coupled to a bidirectional EV charger and a smart inverter structured to convert direct current output from the EV into alternating current, the EV being structured to supply power to the loads during an islanded mode; and a smart load control system that comprises:

a plurality of smart circuit breakers (SCBs) including an islanding and grid-connecting device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid based at least in part on the grid voltage, the EV smart circuit breaker being structured to sense EV voltage and switch ON and OFF the bidirectional EV charger based at least in part on the EV voltage; and a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, perform a safe transition to the selected mode, and monitor the grid voltage and the EV voltage, wherein the smart inverter is an on-board smart inverter, and the smart load control system further comprises:

a neutral forming auto-transformer (NFT) comprising a soft starter and structured to be coupled to the bidirectional EV charger and form a neutral line in the islanded mode; and an NFT SCB coupled to the NFT, wherein the soft starter is structured to reduce inrush currents during switching ON and OFF of the NFT by the NFT SCB and allow current from the smart inverter to be within limits of the smart inverter, and wherein the IGD is further structured to transmit a synchronization signal to the on-board smart inverter.

11. A method of providing power to loads in a power distribution system including an electric grid, an aggregator, an electric vehicle (EV) coupled to a bidirectional EV charger having a smart converter structured to convert direct current output of the EV into alternating current, and a plurality of loads, the electric grid structured to supply power to the loads during a grid-connected mode, the EV structured to supply power to the loads during an islanded mode, the method comprising:

providing a smart load control system that includes (i) a plurality of smart circuit breakers (SCBs) including an islanding and grid-connected device (IGD) coupled to the electric grid, an EV SCB coupled to the bidirectional EV charger, and load SCBs coupled to respective loads, each SCB having a sensor and a controller, the IGD being structured to sense grid voltage and switch ON and OFF the electric grid based at least in part on the grid voltage, the EV smart circuit breaker being structured to sense EV voltage and switch ON and OFF the bidirectional EV charger based at least in part on the EV voltage; and (iii) a building energy system manager communicatively coupled to the plurality of SCBs and the aggregator, the building energy system manager being structured to collect data from each SCB, the data including at least the grid voltage and the EV voltage, select one of the grid-connected mode or the islanded mode based on the grid voltage and the EV voltage, and perform a safe transition to the selected mode;

collecting the data from each SCB;

selecting one of the grid-connected mode or the islanded mode based on the grid voltage and the EV voltage;

performing a safe transition to the selected mode; and monitoring the grid voltage and the EV voltage, wherein the selecting one of the grid-connected mode or the islanded mode based on the grid voltage and the EV voltage comprises selecting the grid-connected mode based on a determination that the grid voltage has remained a predetermined voltage for a predefined period, and wherein the performing a safe transition to the selected mode comprises:

transmitting a first signal to the bidirectional EV charger indicating that the electric grid is available for reconnection;

opening all of the SCBs;

closing the EV SCB and transmit a second signal to the bidirectional EV charger informing that the electric grid is ready for reconnection and commanding the EV to stop providing power to the loads;

opening the EV SCB and verify that the EV voltage has remained zero for the predefined period;

closing the IGD and reconnect the smart load control system to the electric grid; and providing power to the loads from the electric grid.

12. The method of claim 11, wherein based on a determination that the building energy system manager has failed to verify that the EV voltage has remained zero for the predefined period, the method further comprises:

performing interlocking.

13. The method of claim 11, wherein the grid-connected mode comprises a V1G mode and a V2G mode, wherein the bidirectional EV charger selects the V2G mode and transmits a signal indicative of the selection of the V2G mode, and wherein the method further comprises:

initiating a safe transition to the V2G mode.

14. The method of claim 11, wherein the selecting one of the grid-connected mode or the islanded mode based on the grid voltage and the EV voltage comprises selecting the islanded mode based on a determination that the grid voltage has not remained a predetermined voltage for a predefined period or has remained zero for the predefined period, and wherein the performing a safe transition to the selected mode comprises:

transmitting a third signal to the bidirectional EV charger indicating that islanding is pending;

opening all of the SCBs;

closing the EV SCB and verifying that voltage detected in the smart load control system has remained zero for the predefined period;

transmitting a fourth signal that the smart load control system is ready for islanding; and verifying that the EV voltage has remained a predetermined voltage for the predefined period.

15. The method of claim 14, wherein the smart inverter is an off-board inverter and the method further comprises:

closing the load SCBs upon verifying that the EV voltage has remained the predetermined voltage for the predefined period; and providing power to the loads from the EV.

16. The method of claim 14, wherein the smart inverter is an on-board inverter and the smart load control system further includes a neutral forming auto-transformer (NFT) structured to be coupled to the bidirectional EV charger and form a neutral line in the islanded mode and an NFT SCB coupled to the NFT, and the method further comprises:

closing the NFT SCB and verifying that L1-N voltage and L2-N voltage are balanced;

closing the load SCBs; and providing power to the loads from the EV.

17. The method of claim 16, further comprising:

performing interlocking based on at least one of (i) a determination that the voltage detected in the smart load control system has not remained zero for the predefined period; and (ii) a determination that the L1-N voltage and the L2-N voltage are not balanced.

* * * * *